(12) United States Patent
Keefer

(10) Patent No.: US 7,819,129 B2
(45) Date of Patent: *Oct. 26, 2010

(54) RELIEF VENT INCLUDING FLOAT AND SEAL

(76) Inventor: Neal L. Keefer, 4025 NE. Couch St., Portland, OR (US) 97232

( * ) Notice: Subject to any disclaimer, the term of this patent is extended or adjusted under 35 U.S.C. 154(b) by 891 days.

This patent is subject to a terminal disclaimer.

(21) Appl. No.: 10/992,954

(22) Filed: Nov. 18, 2004

(65) Prior Publication Data

US 2005/0067020 A1 Mar. 31, 2005

Related U.S. Application Data

(63) Continuation-in-part of application No. 10/369,255, filed on Feb. 18, 2003, now Pat. No. 7,017,599.

(51) Int. Cl.
*F16K 24/04* (2006.01)
(52) U.S. Cl. .......................... 137/202; 137/43
(58) Field of Classification Search ............ 137/39, 137/43, 72, 73, 202, 587; 251/901

See application file for complete search history.

(56) References Cited

U.S. PATENT DOCUMENTS

| 2,990,842 | A | | 10/1958 | Good | |
|---|---|---|---|---|---|
| 3,586,032 | A | * | 6/1971 | Weinstein | 137/202 |
| 4,796,777 | A | | 1/1989 | Keller | |
| 4,886,089 | A | * | 12/1989 | Gabrlik et al. | 137/202 |
| 5,111,837 | A | | 5/1992 | Morris et al. | |
| 5,313,977 | A | * | 5/1994 | Bergsma et al. | 137/43 |
| 5,325,882 | A | | 7/1994 | Forsythe et al. | |
| 5,405,040 | A | | 4/1995 | Keller | |
| 5,605,175 | A | * | 2/1997 | Bergsma et al. | 137/202 |
| 5,738,132 | A | * | 4/1998 | Zakai et al. | 137/43 |
| 5,762,090 | A | * | 6/1998 | Halamish et al. | 137/43 |
| 6,035,883 | A | * | 3/2000 | Benjey | 137/202 |
| 6,776,182 | B2 | * | 8/2004 | Ishitoya et al. | 137/202 |
| 7,017,599 | B2 | * | 3/2006 | Keefer et al. | 137/202 |

* cited by examiner

*Primary Examiner*—John Rivell
*Assistant Examiner*—Craig Price
(74) *Attorney, Agent, or Firm*—Ingrid McTaggart

(57) ABSTRACT

One embodiment of a thermal relief vent includes a float including a side surface and a top surface, and a seal secured to the surface of the float and extending over the top surface of the float.

20 Claims, 3 Drawing Sheets

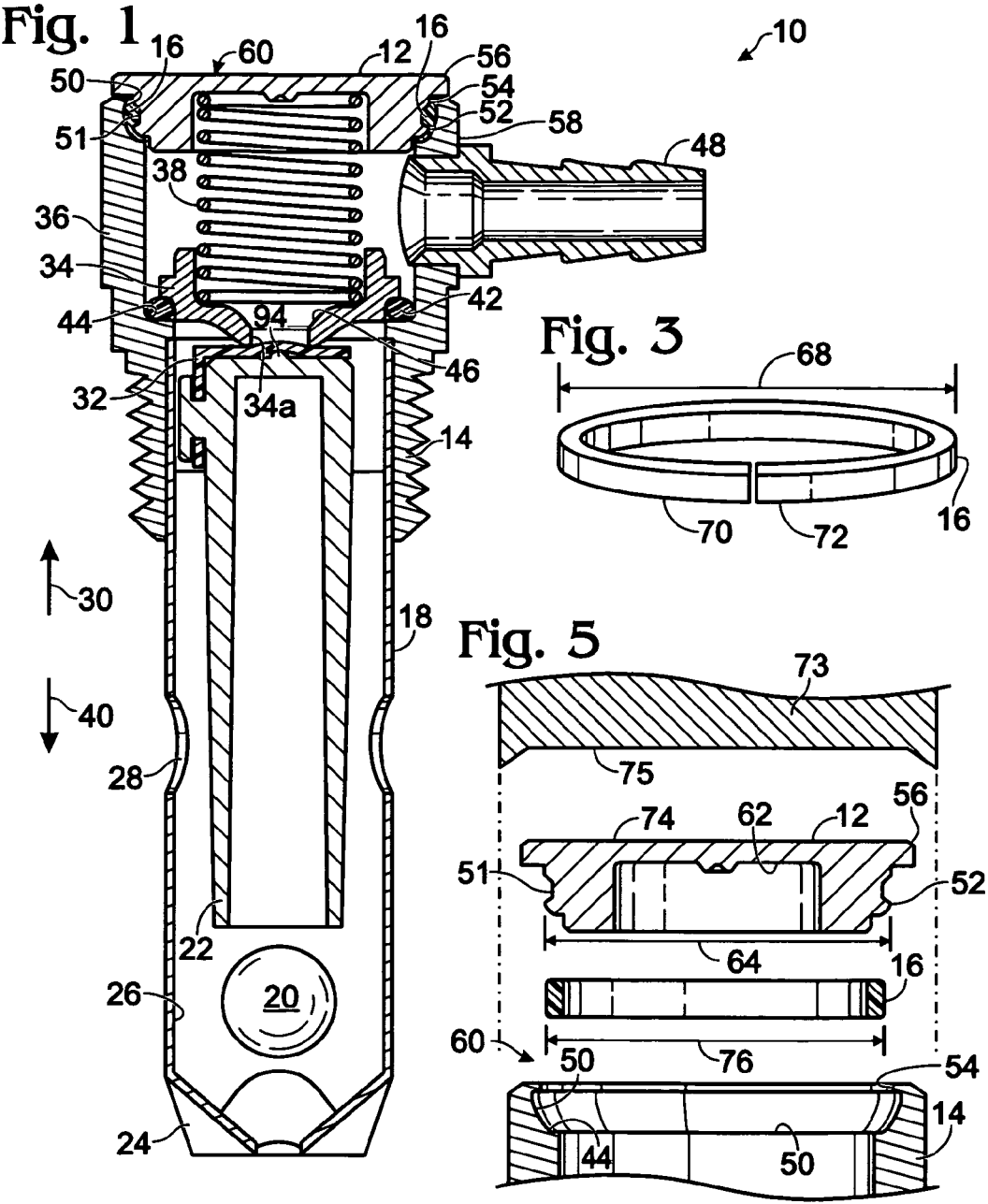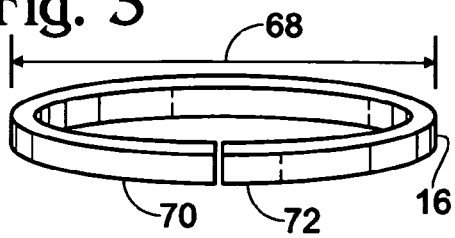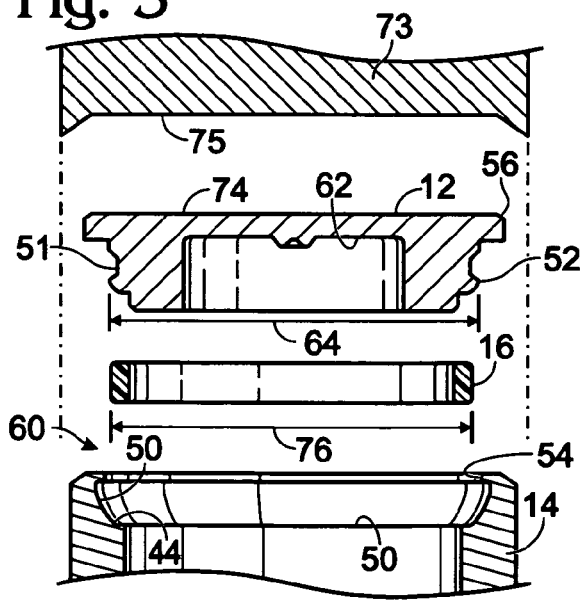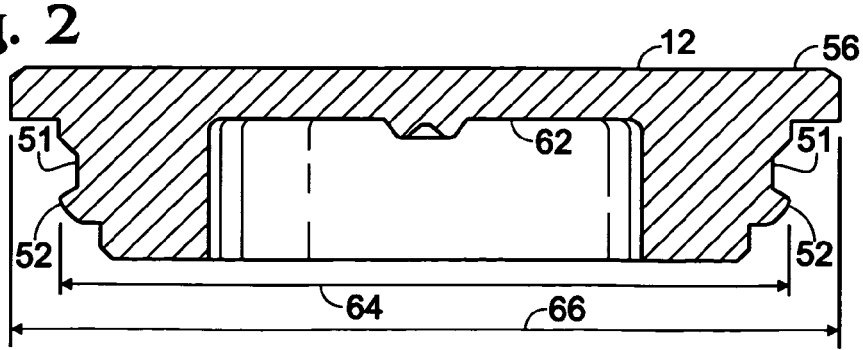

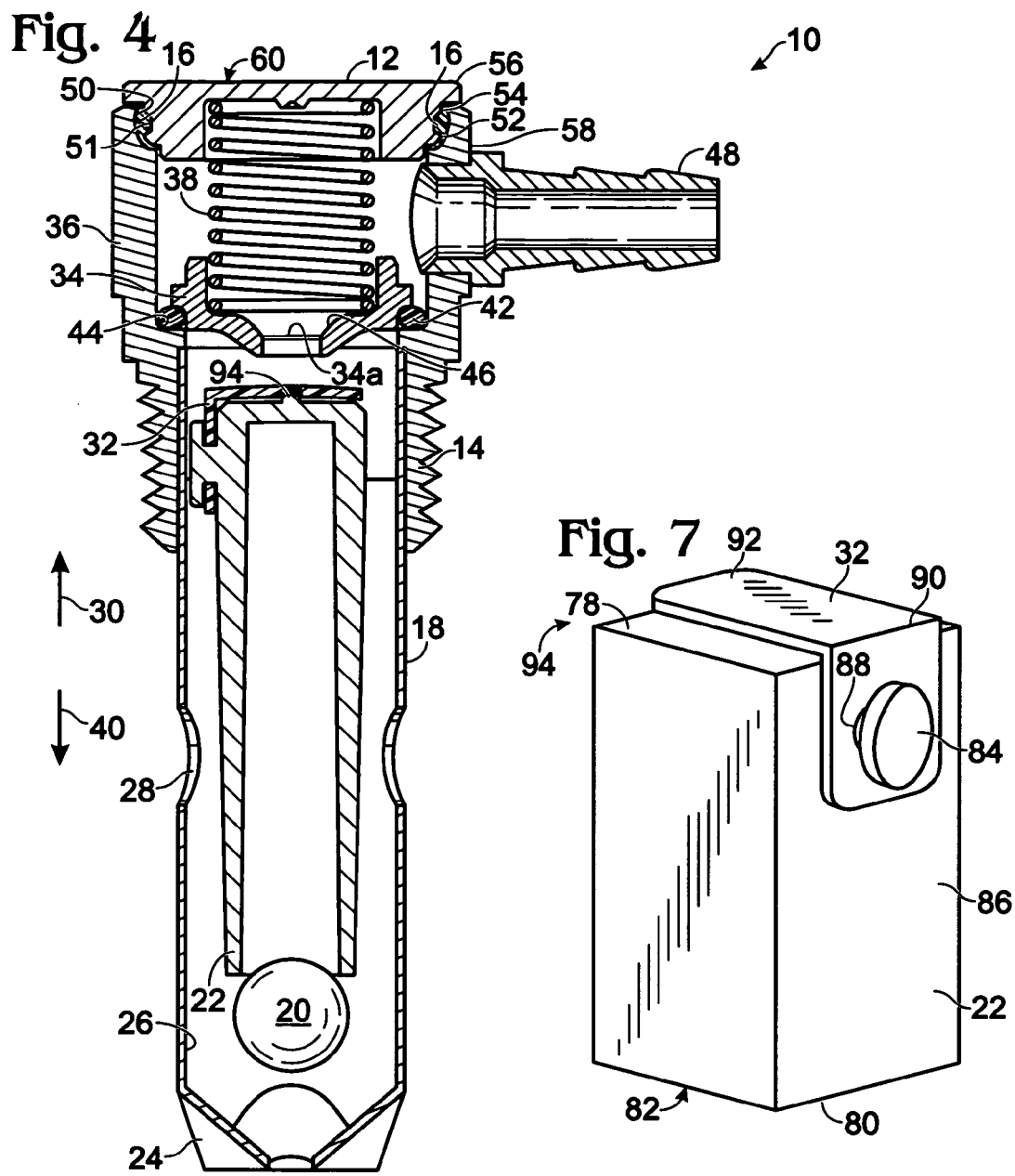
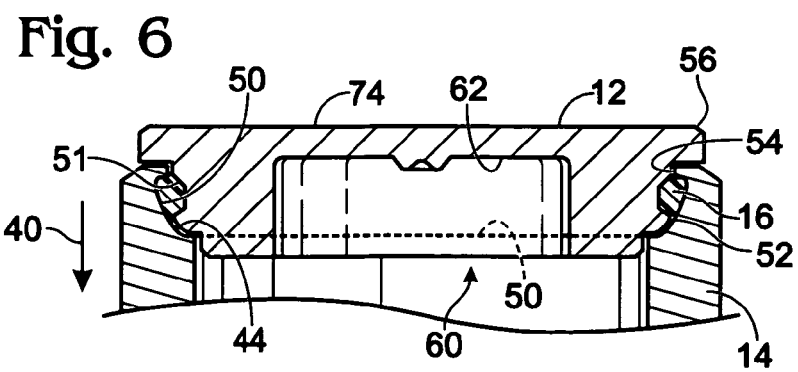

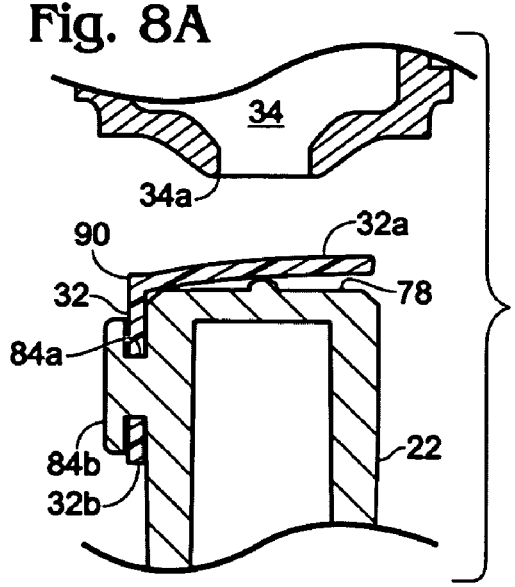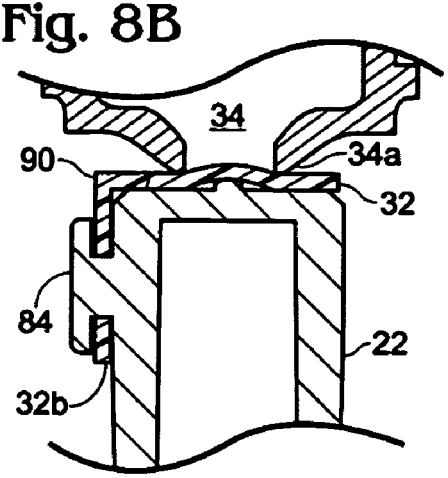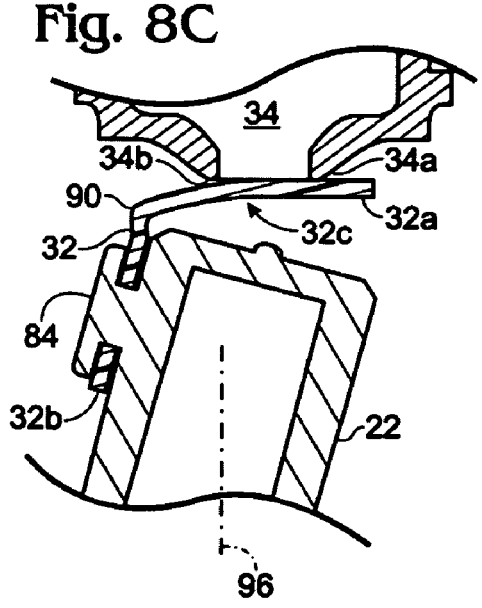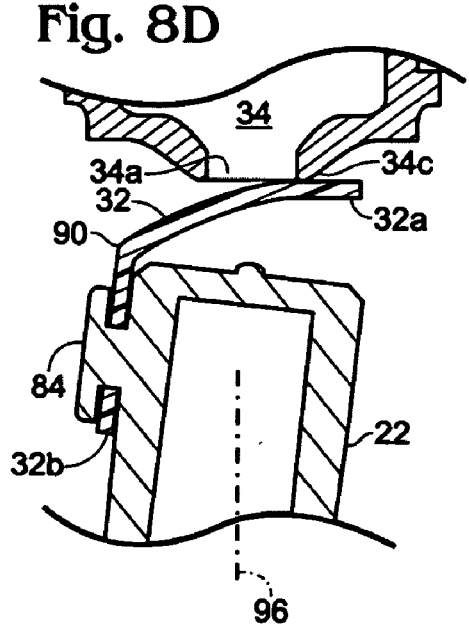

RELIEF VENT INCLUDING FLOAT AND SEAL

This application is a continuation-in-part of patent application Ser. No. 10/369,255, filed on Feb. 18, 2003 now U.S. Pat. No. 7,017,599, and having at least one common inventor, whereby said patent application is hereby incorporated by reference.

1. TECHNICAL FIELD

The present invention relates to an improved thermal relief vent for a fuel tank wherein a float includes an improved seal.

2. BACKGROUND OF THE INVENTION

Fuel tanks, such as those used on commercial vehicles, are subject to a number of safety requirements. One of these safety requirements is the inclusion of a thermal relief system that allows venting of pressure within the fuel tank. Rollover vent valves are typically used in vehicle fuel systems for venting fuel vapor pressure from the fuel tank to either the atmosphere or to a vapor recovery system. Rollover vent valves may also be used to prevent fuel from escaping from the tank during fuel slosh events due to normal vehicle operation. Rollover vents may also be used to prevent fuel loss to the environment during and following a rollover accident.

Most such valves employ a float that is more buoyant than the fuel such that it will rise with the fuel level toward a valve seat that is connected to the atmosphere or to a vapor recovery system. The float is usually fitted at its top with some type of sealing element, either included as an integral feature of the float or in the form of a separate sealing element manufactured of a fuel resistant elastomer. Such separate sealing elements have been used frequently in commercial practice to provide a more effective seal, making use of the pliable properties of an elastomeric seal to effectively seal against minor surface irregularities of a valve seat.

When fuel in the tank is below the level of the float, the valve orifice is free to pass vapor or incoming gasses out to the atmosphere. If the fuel level rises due to normal vehicle motion, the float momentarily rises, urging the valve element into contact with the valve seat, and thus preventing fuel spillage. In the event of a rollover that may position the fuel tank and the valve structure upside down, a structure, such as a steel ball with a weight greater than the float buoyancy force, is used to overcome the buoyancy of the float, causing the valve to close and thereby preventing fuel spillage.

Many patents, including U.S. Pat. No. 2,990,842 to Good, U.S. Pat. No. 4,770,201 to Zakai, U.S. Pat. No. 4,886,089 to Gabrlik, and U.S. Pat. No. 4,753,262 and U.S. Pat. No. 5,313,977 to Bergsma, disclose designs employing floats with elastomeric seals.

SUMMARY OF THE INVENTION

The present invention includes a vent seal and a float assembly used in a fuel system vent valve assembly. The vent seal is manufactured in a L-shape from a flexible elastomer that is sufficiently pliable to conform to minor surface irregularities in the mating valve seat.

BRIEF DESCRIPTION OF THE DRAWINGS

FIG. 1 is a cross-sectional view of the thermal relief vent with the vent cap and ring of fusible material crimped therein, with the vent shown in a pressurized configuration;

FIG. 2 is a cross-sectional view of one embodiment of the vent cap;

FIG. 3 is an isometric view of the ring of fusible material;

FIG. 4 is a cross-sectional view of the thermal relief vent with the vent cap and ring of fusible material crimped therein, with the vent shown in a non-pressurized configuration;

FIG. 5 is a detailed cross-sectional view of one embodiment of the cap and ring of fusible material prior to crimping thereof;

FIG. 6 is a detailed cross-sectional view of the cap and ring of fusible material after crimping thereof; and FIG. 7 is an isometric view of the float and the float seal of the thermal relief vent.

FIGS. 8A-8D are detailed cross-sectional side views of the seal and the float in a nominal position and during peel-away action of the seal from the valve seat.

DETAILED DESCRIPTION OF THE PREFERRED EMBODIMENT

Referring to the figures, FIG. 1 shows a cross-sectional view of the thermal relief vent 10 with the vent cap 12 positioned on the vent body 14, and a ring of fusible material 16 crimped therein, with the vent shown in a pressurized configuration. In the embodiment shown, vent body 14 comprises an elongate float section 18, also referred to as a cage tube section 18, which houses a ball 20 and a float 22. Cage body 18 includes a crimped end portion 24 which prevents the exit of ball 20 and float 22 from an interior 26 of cage body 18. The crimped end portion 24 and apertures 28 allow fuel and pressure within the fuel tank to communicate with interior 26 of cage body 18. In a pressurized configuration, i.e., when the interior of the fuel tank and therefore the interior 26 of the cage body 18 is subject to a pressure above a first predetermined value, or in the condition of partial tank rollover, the fuel level will cause float 22 to move in a direction 30 within vent body 14 such that a seal 32 positioned on float 22 will contact a vent valve 34, having a lower opening 34a, positioned within a neck portion 36 of vent body 14. A spring 38 is positioned within neck portion 36 of the vent body 14, and, up until a second predetermined pressure is exerted against the spring in direction 30, the spring 38 exerts a pressure on vent valve 34 in a direction 40, forcing an O-ring 42 of the vent valve 34 against a seat 44, or shoulder 44, of neck portion 36 of vent body 14. Once the pressure within the tank exceeds the second predetermined pressure, float 22 moves further in direction 30, thereby forcing vent valve 34 further in direction 30, thereby slightly compressing spring 38 in direction 30. This movement of vent valve 34 in direction 30, so that O-ring 42 is no longer in contact with shoulder 44, allows fuel or pressurized gas within the fuel tank and vent to escape from the vent 14 through an aperture 46 of neck portion 36 and out of the vent body 14 through a hose barb 48.

Still referring to FIG. 1, spring 38 is retained within neck portion 36 of the vent body 14 by vent cap 12 and ring of fusible material 16. In particular, during assembly of thermal relief vent 10, ring of fusible material 16 (shown more clearly in FIG. 3) is positioned in an annular recess 50 of vent neck portion 36. Vent cap 12 is then crimped on the vent body 14, i.e., vent cap 12 is forced in direction 40 against ring of fusible material 16. Ring 16 typically is manufactured of a thermal relief material, i.e., a material that will soften or otherwise yield upon reaching a predetermined temperature. In a preferred embodiment, ring 16 is manufactured of an alloy of lead, but other thermal relief materials may be utilized for particular applications. As vent cap 12 is forced or crimped in direction 30, fusible ring 16 "flows around" one or more threads 52 on vent cap 12, one or more threads 54 in annular recess 50 of vent neck portion 36, and throughout annular recess 50 of neck portion 36 and throughout recess 51 of vent cap 12. Vent cap 12 is crimped on vent body 14 until a shoulder 56 of the vent cap 12 abuts the top portion 58 of vent body 14. With the cap 12 in this crimped position on body 14, the ring of fusible material 16 has "flowed" around threads 52 and 54, and typically has filled annular recesses 50 and 51 such that ring 16 creates a mechanical and an airtight seal between vent cap 12 and vent body 14. Accordingly, in the method of manufacturing the thermal relief vent 10 of the present invention, vent cap 12 itself is used as the force mechanism to seat ring 16.

Use of cap 12 itself to apply a force to ring 16 eliminates the positioning problems posed by the prior art wherein the cap must be held in place while molten metal is injected around the cap. Moreover, the crimping method of the present invention eliminates the need for the use of molten metal, thereby eliminating the hazards and costs associated with molten metal casting operations. Additionally, the ring 16 of fusible material utilized in the present invention typically has a circumference that matches the circumference of annular recess 50 of neck portion 36 such that the mechanical seal of fusible material positioned between vent cap 12 and vent body 14 fills the entirety of annular recesses 50 and 51 and does not include air pockets, as do some cast seals of the prior art.

As stated above, ring 16 typically is manufactured of a thermal relief material, i.e., a material such as a lead alloy that will soften or otherwise yield upon reaching a predetermined temperature. For example, when thermal relief vent 10, or the contents within a fuel tank on which the vent is mounted, reaches a predetermined temperature, the fusible material will also be subjected to the predetermined temperature. Upon reaching this predetermined temperature, fusible material 16 will soften or yield, thereby allowing cap 12 to become loosened with respect to vent body 14. Upon softening of fusible material 16, the mechanical seal created by the fusible material is weakened such that spring 38, or pressure within interior 26 of vent body 14, will force vent cap 12 from vent body 14 in direction 30. Once vent cap 12 is forced from vent body 14, pressure within interior 26 of the vent body is vented out an opening 60 of vent body 14.

Each of the components of vent 10 typically are manufactured of a material that will withstand the high temperatures and pressures, and the harsh environmental conditions associated with the commercial trucking industry. In one embodiment, cap 12, body 14 and hose barb 48 are manufactured of brass. Float ball 20 and spring 38 may be manufactured steel. Float 22 typically is manufactured of plastic or another like buoyant material. Seal 32 and O-ring 42 typically are manufactured of a flexible material, such as rubber, silicon, plastic or the like.

FIG. 2 shows a cross-sectional view of vent cap 12 including shoulder 56, external threads 52, annular recess or groove 51, and an interior recess 62 for receiving spring 38. Annular groove 51 defines a diameter 64 and shoulder 56 defines a slightly larger diameter 66.

FIG. 3 shows an isometric view of the ring of fusible material 16. Ring 16 typically has a diameter 68 approximately the same size as diameter 64 of cap 12, and smaller than diameter 66 of cap 12. Ring 16 may be manufactured by taking an elongate piece of fusible material, cutting it to a preferred length, and then bending it into a circular shape as shown in FIG. 3 such that ends 70 and 72 abut one another. In another embodiment, ring 16 may be manufactured by taking an elongate piece of fusible material, cutting it in a preferred length, and then bending it into a circular shape such that ends 70 and 72 overlap one another. In yet another embodiment, ring 16 may be stamped, such as in the circular shape as shown, from a sheet of fusible material. In still another embodiment, ring 16 may be cast from molten material. Applicants note that such a casting method may be conducted for the fabrication of ring 16, prior to placement of the solid, previously formed ring 16 within body 14. In a preferred embodiment, a lead "wire" is wound into a helix on a mandrel. The helix is then cut along the length of the mandrel to form many lead rings with a single cut.

FIG. 4 shows a cross-sectional view of the thermal relief vent 10 in a non-pressurized configuration. In particular, float 22 is shown in a lowered position such that seal 32 on the float is not in contact with vent valve 34.

FIG. 5 shows a detailed cross-sectional view of the cap 12, body 14 and ring 16 of fusible material prior to crimping thereof. Prior to crimping of cap 12 to vent body 14, cap 12 is positioned above opening 60 of the vent body. Cap 12 may be held in such a position, for example, manually by a assembly device 73 that has a recess 75 into which the top portion 74 of cap 12 seats. Recess 75 generally is similar in shape to cap 12 such that device 73 is self aligning. Cap 12 is held in this seated and centered position by the force of spring 38 (not shown in this figure). Ring 16 is positioned on shoulder 44, within annular recess 50 and adjacent threads 54 of vent body 14. A diameter 76 of threads 54 and recess 50 of vent body 14 typically is slightly larger than diameter 64 of threads 52 and recess 51 of cap 12 such that the threads 52 and 54 do not mate with one another but are positioned adjacent one another. In this manner, fusible material 16 may "flow" around threads 52 and 54, and through recesses 50 and 51 so as to secure cap 12 on vent body 14. In another embodiment, threads 52 and 54 may mate with another (such that diameters 64 and 76 are approximately the same size), thereby requiring cap 12 to be twisted or turned with respect to body 14, in order for cap 12 to be received within annular recess 50 of vent body 14. In this embodiment wherein the threads mate with one another, a sufficient amount of space will still remain between the mating threads so that ring 16 will "flow" around threads 52 and 54 during crimping of cap 12 to body 14.

FIG. 6 shows a detailed cross-sectional view of cap 12, body 14 and ring 16 of fusible material after crimping thereof wherein assembly fixture 73 has been removed. In particular, to secure cap 12 to body 14, cap 12 is moved in direction 40 toward body 14 by assembly 73 with a force great enough to cause fusible material 16 to flow, i.e., to deform, such that fusible material 16 conforms to the shape of annular recesses 50 and 51, and threads 52 and 54. Of course, body 14 can be moved toward cap 12 or both the body and cap may be moved toward each other. The force exerted against cap 12 and body 14 should preferably be sufficient to cause deformation of ring 16 but less than the force required to deform cap 12 and body 14. The amount of force required for any particular application will depend on, for example, the size and shape of threads 52 and 54, the size of annular recesses 50 and 51, the type of fusible material used to manufacture ring 16, the size of ring 16, and the depth of threads 52 and 54. As shown in FIG. 6, ring 16 forms a mechanical and an airtight seal between cap 12 and body 14 such that cap 12 will not become displaced with respect to body 14 until ring 16 is softened thereby allowing cap 12 to be removed therefrom.

FIG. 7 shows an isometric view of the float 22 and the float seal 32 of the thermal relief vent 10. In the embodiment shown, float 22 comprises an elongate float having a generally square cross sectional shape wherein top surface 78 is solid and a lower surface 80 allows access to a hollow interior 82 of the float. A tab 84 extends outwardly from a side surface 86 of the float and engages an aperture 88 of seal 32. Seal 32, in the embodiment shown, is manufactured with a bend 90 in a midsection thereof, such that an end region 92 of the seal is positioned overlying top surface 78 of float 22. Due to bend 90 of the seal, and due to the flexible and resilient nature of the material from which seal 32 is manufactured, end region 92 of the seal is flexibly positioned on top surface 78 of the float. As shown more clearly in FIG. 1, top surface 78 of float 22 may include an upwardly extending projection 94 sized to be received within opening 34a of vent valve 34. Accordingly, in the pressurized condition shown in FIG. 1, projection 94 is aligned with opening 34a such that seal 32 contacts the lip of opening 34a around a circumference thereof. Moreover, due to bend 90 of the seal 32 on float 22, the seal is loosely positioned above top surface 78 of the float such that the seal will be correctly positioned for contact with opening 34a of the vent valve. Because seal 32 is secured to side surface 86, tab 84 is positioned away from top sealing surface 78 of the float and, therefore, will not interfere with sealing of the vent.

FIGS. 8A-8D are detailed cross-sectional side views of seal 32 and float 22 in an open position of the relief vent and during peel-away action of the seal from valve seat 34a. As shown in FIG. 8A, in an un-pressurized condition of the fuel tank, float 22 is in a lowered positioned with respect to valve seat 34a and seal 32 is in a nominal, unbiased condition. A lower leg 32b of the seal is secured to float 22 by tab or mounting cleat 84. The mounting cleat holds seal 32 tightly against the side of the float such that the seal is immovably secured to mounting cleat 84 and such that the seal does not pivot on the cleat. In particular, mounting cleat 84 has a stem region 84a and an enlarged head region 84b, stem 84a having a length substantially the same as a thickness of the seal in the region of head region 84b. In this manner, the seal is held firmly against the float in the region of cleat 84.

In the nominal, unbiased condition of seal 32 shown in FIG. 8A an upper leg 32a of L-shaped seal 32 extends upwardly from top surface 78 of float 22. This upwardly extended position of seal 32 allows it to contact seat 34a as float 22 is raised during periods when fuel slosh waves within the fuel tank impinge the float, causing it to rise as a result of buoyant forces (see FIG. 8B). While the seal is in contact with the valve seat during these fuel slosh events it is possible for the pressure inside the fuel tank to increase above atmospheric as a result of the buildup of returned gaseous vapors from the engine.

The flexibility of leg 32a with respect to the remainder of seal 32 provides heightened sealing sensitivity by allowing seal 32 to be pressed against seat 34a with relatively little pressure on float 22. In other words, the upward, resilient bias of seal 32 in the nominal position is easily overcome by a relatively small force such that seal 32 is easily deflected and bent to allow the seal to seat on valve seat 34a without a large upward force applied to float 22.

As shown in FIG. 8B, seal 32 is shown in the sealed position against valve seat 34a. Upper leg 32a of L-shaped seal 32 is positioned on and pressed against the top surface 78 of float 22 and against valve seat 34a. Seal 32 is urged to a sealed position against float 22 and seat 34a by a very small increment of differential pressure between the inside of the tank and the atmosphere. In other words, seal 32 is manufactured of a very flexible material that easily bends and flexes so that a small amount of pressure is required to bend the seal from its nominal, unbiased position shown in FIG. 8A.

As shown in FIG. 8C, when fuel within the fuel tank is not present to hold the float closed as in FIG. 8A, float 22 will begin to move downwardly. Due to the flexibility of seal 32, upper leg 32a of seal 32 bends or flexes at a position 32c within upper leg region 32a such that seal 32 is first peeled away from valve seat 34a at a first edge 34b of the valve seat. This low resistance to bending of seal 32 causes the weight of float 22 to act in tension against seal 32 when fuel is not present, thereby pulling one corner of seal 32 away from seat 34a and slightly tilting float 22 with respect to a vertical axis 96. This tension-induced peeling action causes the valve to open at much higher internal tank pressures, i.e., causes the valve to open earlier, than would be the case with the rigid, lever-action seals disclosed by the prior art. During peel-away action of seal 32 from seat 34, an upper region of second leg 32b of the seal may be pulled away from float 22 such that bend region 90 of seal 32 temporarily does not contact the float.

FIG. 8D shows the seal just before it is completely peeled away from valve seat 34a. In this condition float 22 has almost righted itself with respect to vertical axis 96 and upper leg 32a of the seal is only in contact with a last remaining portion 34c of seat 34. Upper region of second leg 32b of the seal and bend region 90 of the seal may have moved back-into contact with float 22. After seal 32 is completely peeled away from valve seat 34a, the float and seal may return to their unbiased, nominal conditions shown in FIG. 8A.

The L-shape of seal 32 allows the seal to be attached to float 22 at a single point, i.e., at cleat 84. This cleat mounting of L-shaped seal 32 is simple in design such that seal 32 may be inexpensively manufactured. Seal 32 is maintained in position on float 22 by the tight fit of aperture 88 of seal 32 on cleat 84. Seal 32 is maintained in position on float 22 by contact of bend 90 of seal 32 against the upper edge of float 22 in the nominal, unbiased condition and by the tight fit of the seal on cleat 84. The flexibility of seal 32, i.e., the non-rigid structure of seal 32, precludes it from acting as a lever or from pivoting, as is described in the prior art. In contrast, flexible seal 32 peels away from valve seat 34a as the seal bends at point 32c with respect to float 22 and valve seat 34a.

In the above description numerous details have been set forth in order to provide a more through understanding of the present invention. It will be obvious, however, to one skilled in the art that the present invention may be practiced using other equivalent designs.

I claim:

1. A thermal relief vent, comprising:
   a float including a side surface and an uppermost top surface positioned substantially perpendicular to said side surface;
   a fastener secured to said side surface; and
   a seal secured by said fastener only to said side surface of said float and extending over said uppermost top surface of said float.

2. The vent of claim 1 wherein said seal comprises a L-shape.

3. The vent of claim 1 wherein said seal is manufactured of a flexible material.

4. The vent of claim 1 further including a valve seat, wherein said seal contacts said valve seat during pressurized conditions of said thermal relief vent.

5. The vent of claim 1 wherein said seal peels away from a valve seat when said float moves away from said valve seat.

6. The vent of claim 1 wherein said fastener comprises a mounting cleat on said side surface and wherein said mounting cleat is manufactured integral with said float to define a single structure.

7. The vent of claim 6 wherein said seal is secured to said mounting cleat such that said seal does not pivot thereon.

8. A thermal relief vent, comprising:

a float including a side surface and an uppermost top surface positioned substantially perpendicular to said side surface; and a L-shaped seal secured only to said side surface of said float, said seal formed as an elongate member having only a single bend therein such that said seal extends over said side surface and said uppermost top surface.

9. The vent of claim 8 wherein said L-shaped seal is manufactured of a flexible and resilient material.

10. The vent of claim 8 wherein said seal is manufactured of a material chosen from one of rubber, silicon and plastic.

11. The vent of claim 8 wherein said seal includes said bend in a central region thereof, said bend positioned at an upper edge of said float when said seal is in a nominal, unbiased condition.

12. The vent of claim 8 wherein said seal is positioned upwardly from said uppermost top surface of said float in a nominal, unbiased condition of said seal.

13. The vent of claim 8 wherein said seal is positioned downwardly on said uppermost top surface of said float in a pressurized condition of said vent.

14. A thermal relief vent, comprising:

a vent body including a valve seat;

a float movably positioned within said vent body; and a peel-away seal secured at only a single location to a side surface of said float, said seal movable into contact with said valve seat when a pressure of said vent reaches a predetermined pressure and said seal peeling away from said valve seat when said pressure of said vent falls below said predetermined pressure, wherein said seal is unsecured to said vent body, said seal formed as an elongate member having only a single bend therein that defines a substantially square corner such that said seal extends over said side surface of said float and an uppermost top surface of said float.

15. The vent according to claim 14 wherein said seal is secured to said float by a mounting cleat on said float, said mounting cleat having a stem region and a head region, said stem having a length substantially the same as a thickness of said seal in a cleat region of the seal.

16. The vent according to claim 14 wherein said peel-away seal in a nominal, unbiased condition is positioned upwardly from said uppermost top surface of said float.

17. The vent according to claim 14 wherein said bend imparts a resiliency to said seal so as to position an end region of said seal upwardly from said uppermost top surface of said float in said nominal, unbiased condition.

18. A method of venting a fuel tank, comprising:

providing a valve seat that communicates between an interior and an exterior of a fuel tank;

providing a float movably positioned adjacent said valve seat;

securing a seal only to said float at a single location, said seal formed as an elongate member having only a single L-shaped bend therein such that said seal extends over a side surface of said float and an uppermost top surface of said float, said uppermost top surface positioned substantially perpendicular to said side surface; and pressurizing said fuel tank so as to move said float toward said valve seat such that said seal seals said valve seat.

19. The method of claim 18 further comprising reducing a pressure within said fuel tank so as to move said float away from said valve seat such that said seal is peeled away from said valve seat.

20. A fuel tank pressure relief vent, comprising:

means for venting pressure from a fuel tank;

means for sealing said means for venting; and means for moving said means for sealing, said means for sealing secured at a single location on said means for moving, formed as an elongate member having only a single substantially ninety degree bend such that said means for sealing extends over a side surface of said means for moving and an uppermost top surface of said means for moving, and unsecured to said means for venting.

* * * * *